US006859005B2

(12) United States Patent
Boliver

(10) Patent No.: US 6,859,005 B2
(45) Date of Patent: Feb. 22, 2005

(54) GARBAGE CONTAINER WITH AUTOMATIC DOOR OPERATOR

(76) Inventor: Lynette S. Boliver, P.O. Box 454, Croghan, NY (US) 13327

(*) Notice: Subject to any disclaimer, the term of this patent is extended or adjusted under 35 U.S.C. 154(b) by 0 days.

(21) Appl. No.: 10/462,881

(22) Filed: Jun. 18, 2003

(65) Prior Publication Data

US 2004/0257020 A1 Dec. 23, 2004

(51) Int. Cl.[7] .................... H02P 1/04

(52) U.S. Cl. .................... 318/480; 318/16; 318/280; 318/284; 318/460; 220/200; 220/211; 220/260; 220/262; 220/263

(58) Field of Search .................... 318/16, 480, 280–286, 318/445, 460, 466, 468; 220/260, 263, 200, 211, 262

(56) References Cited

U.S. PATENT DOCUMENTS

| | | | | | |
|---|---|---|---|---|---|
| 3,708,085 | A | * | 1/1973 | Bumpas | 220/484 |
| 3,891,115 | A | * | 6/1975 | Ono | 220/260 |
| D242,595 | S | | 12/1976 | De Lise et al. | |
| 4,286,515 | A | * | 9/1981 | Baumann et al. | 100/233 |
| 4,489,810 | A | * | 12/1984 | Curtis | 312/272.5 |
| 4,851,742 | A | * | 7/1989 | Chapman | 318/286 |
| 4,981,275 | A | * | 1/1991 | Sheu | 248/147 |
| 4,996,467 | A | | 2/1991 | Day | |
| 5,329,212 | A | | 7/1994 | Feigleson | |
| 5,932,982 | A | | 8/1999 | Pezzelli, Jr. | |
| 6,150,939 | A | | 11/2000 | Lin | |
| 6,519,130 | B1 | * | 2/2003 | Breslow | 361/170 |
| 6,752,476 | B2 | * | 6/2004 | Lin | 312/290 |

* cited by examiner

*Primary Examiner*—David Martin
*Assistant Examiner*—Tyrone Smith

(57) ABSTRACT

A garbage container includes a base section for collecting garbage and a lid section attachable to the base section. The lid section includes an access door pivotally operable therewith. The garbage container further includes a sensor connected to the top surface of the lid section and for determining when an object has reached a predetermined distance therefrom. The garbage container further includes a housing and a motor disposed therein and connected to the sensor. A plurality of arm members each have a first end portion passing through a corresponding one of a plurality of slots and are operable by the motor. The plurality of arm members each further has a second opposed end portion connected to the access door respectively. The plurality of arm members are preferably selectively pivotable about the first end portions and in a generally arcuate path to thereby move the access door between open and closed positions based upon signals transmitted by the sensor.

20 Claims, 3 Drawing Sheets

GARBAGE CONTAINER WITH AUTOMATIC DOOR OPERATOR

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a garbage container and, more particularly, to a garbage container including means for automatically opening and closing the door thereof when an object reaches a predetermined distance therefrom.

2. Prior Art

Trash enclosures may hold trash of all types. Trash may include household garbage, restaurant garbage, medical waste, chemical waste, and other industrial waste. Enclosures may partially or fully enclose trash depending on the type of trash to be enclosed. Trash enclosures often have lids which open to receive trash and close to contain odor, hide trash from view and prevent the trash from contaminating areas beyond the enclosure.

Lids are often opened by hand. Hand opened lids have several problems. In some cases, contact between a hand and the lid may spread contamination. Additionally, sometimes a free hand may not be available to open the lid.

Medical workers and food handlers, for example, may not wish to contact trash containers to avoid biological contamination. Similarly, chemical workers may not wish to contact a container such as a trash enclosure which holds chemical contaminants. Contact with any potentially contaminated container is undesirable.

In fast food restaurants, food is often served on trays. Upon finishing a meal, the trays are carried to a trash container where the trash is dumped and the tray deposited. Fast food wrappers and other waste may fly off of the tray when being dumped into the container. Two hands may be necessary to carry and dump such a tray without spilling the waste. It can be appreciated that a free hand is not always available for opening the lid and, consequently, waste may spill. In particular, trash may spill if the lid is not properly held open because the lid may push the trash off of the tray. This situation may be observed at many fast food restaurants which have hand operated trash enclosure lids. Such spills are sought to be avoided.

In order to facilitate insertion of trash into a trash enclosure, automatically operable lids have been developed. Such automatically operable lids may be fitted with a sensor system which automatically opens the lid upon demand. Ideally, such enclosures will eliminate the need for pushing the lid open by hand. An example of an enclosure having a sensor is described in U.S. Pat. No. 6,150,939 to Lin, which discloses a garbage container including an electric-controlled sensing device disposed at an upper end of a garbage container body.

Unfortunately, even with such prior art attempts, there still remains a need to provide an automatic garbage door operator that, upon a person's approach, automatically operates vertically hung doors of conventional garbage containers typically used in fast-food restaurants.

BRIEF SUMMARY OF THE INVENTION

In view of the foregoing background, it is therefore an object of the present invention to provide a garbage container with an automatic door operator. These and other objects features, and advantages of the invention are provided by an apparatus for receiving garbage and including a base section defining an opening for collecting garbage and a lid section attachable to the base section. The lid section includes an access door pivotally operable therewith and has a top surface.

The apparatus further includes means for selectively moving the access door between open and closed positions. The moving means includes a sensor connected to the top surface of the lid section and for determining when an object has reached a predetermined distance therefrom. The moving means further includes a housing and a motor disposed therein and connected to the sensor. The housing preferably has a plurality of slots formed therein and spaced apart from each other.

A plurality of arm members each have a first end portion passing through a corresponding one of the plurality of slots and are operable by the motor. The plurality of arm members each has a second opposed end portion connected to the access door respectively. The plurality of arm members are preferably selectively pivotable about the first end portions and in a generally arcuate path so that when the second end portions thereof move toward a rear portion of said lid section said access door is moved to an open position and when the second end portions move toward a front portion of said lid section said access door is moved to a closed position. A power cord is connected to the sensor and the motor and supplies power thereto.

The lid section preferably includes a conduit for guiding the power cord from a rear portion of the lid section to a front portion thereof. The motor includes a rod passing therethrough and operably controlled thereby. The rod has a longitudinal axis and opposed end portions extending outwardly from the motor with the first end portions of the plurality of arm members being connected to the end portions of the rod respectively.

The plurality of arm members may have a substantially L-shape. The housing has a lower portion and the plurality of slot portions are preferably formed thereat. The access door has a top portion and the respective second end portions of the plurality of arm members are preferably attached adjacent thereto. The access door is pivotable preferably about its top portion.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art.

Figure 1:
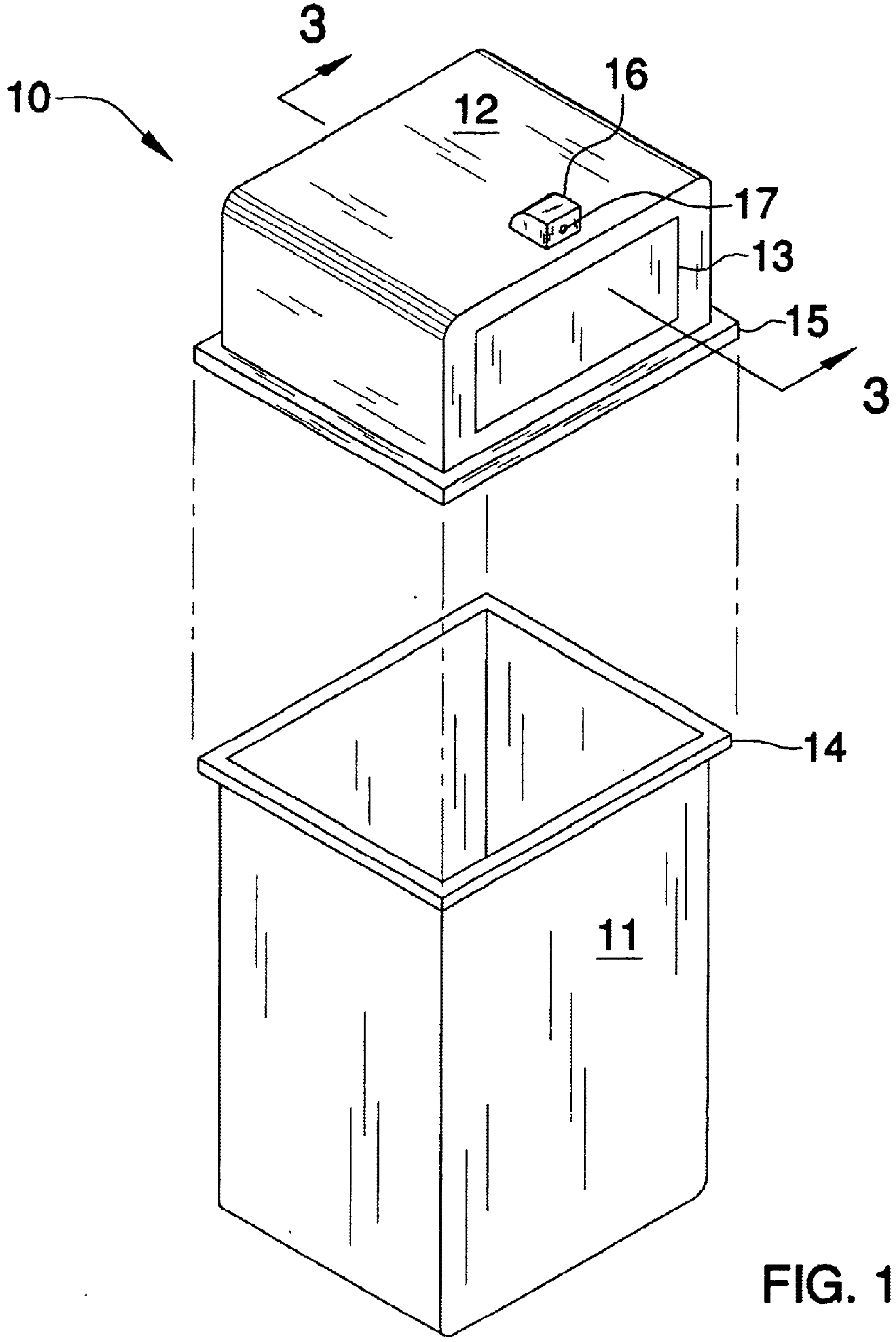
FIG. 1 is a front perspective view of a garbage container showing its lid section detached from its base section, in accordance with the pre sent invention.

The garbage container of this invention is referred to gene rally in FIG. 1 by the reference numeral 10 and is intended to allow a person to deposit garbage therein without having to push open the access door thereof. It should be understood that the garbage container 10 may include various types of access doors and should not be construed as limited to including only vertically hung access doors.

The garbage container 10 includes a base section 11 including a plurality of substantially planar walls integral with each other and for defining a hollow interior for receiving waste articles therein. The base section 11 has a substantially rectangular shape but, of course, can be shaped in a variety of ways. The base section 11 further includes a lip portion 14 disposed at a top portion thereof and extending around the upper perimeter. The lip portion 14 extends outwardly from the side walls of the base section 11 and provides a receiving area for a corresponding lid portion 15 of lid section 12 to rest thereon.

The lid section 12 has a substantially rectangular shape similar to the shape of the base section 11. The lid section 12 also includes a plurality of substantially planar walls integral with each other. One of the plurality of walls, preferably at a front portion of the lid section 12, includes an access door 13. Such an access door is defined within the lid section 12 and has a top portion pivotally connected thereto. Therefore, the access door 13 may be selectively pivoted about its top portion and opened inwardly towards a rear portion of the lid section 12 for allowing waste articles to be dispensed into the base section 11.

A sensor housing 16 is attached to the top surface of lid section 12 and is disposed generally medially towards the front portion thereof. The sensor housing 16 includes a sensor eye 17 disposed at a front face thereof and facing generally towards the front portion of garbage container 10 so that it can detect when an object reaches a predetermined distance thereof.

Figure 2:
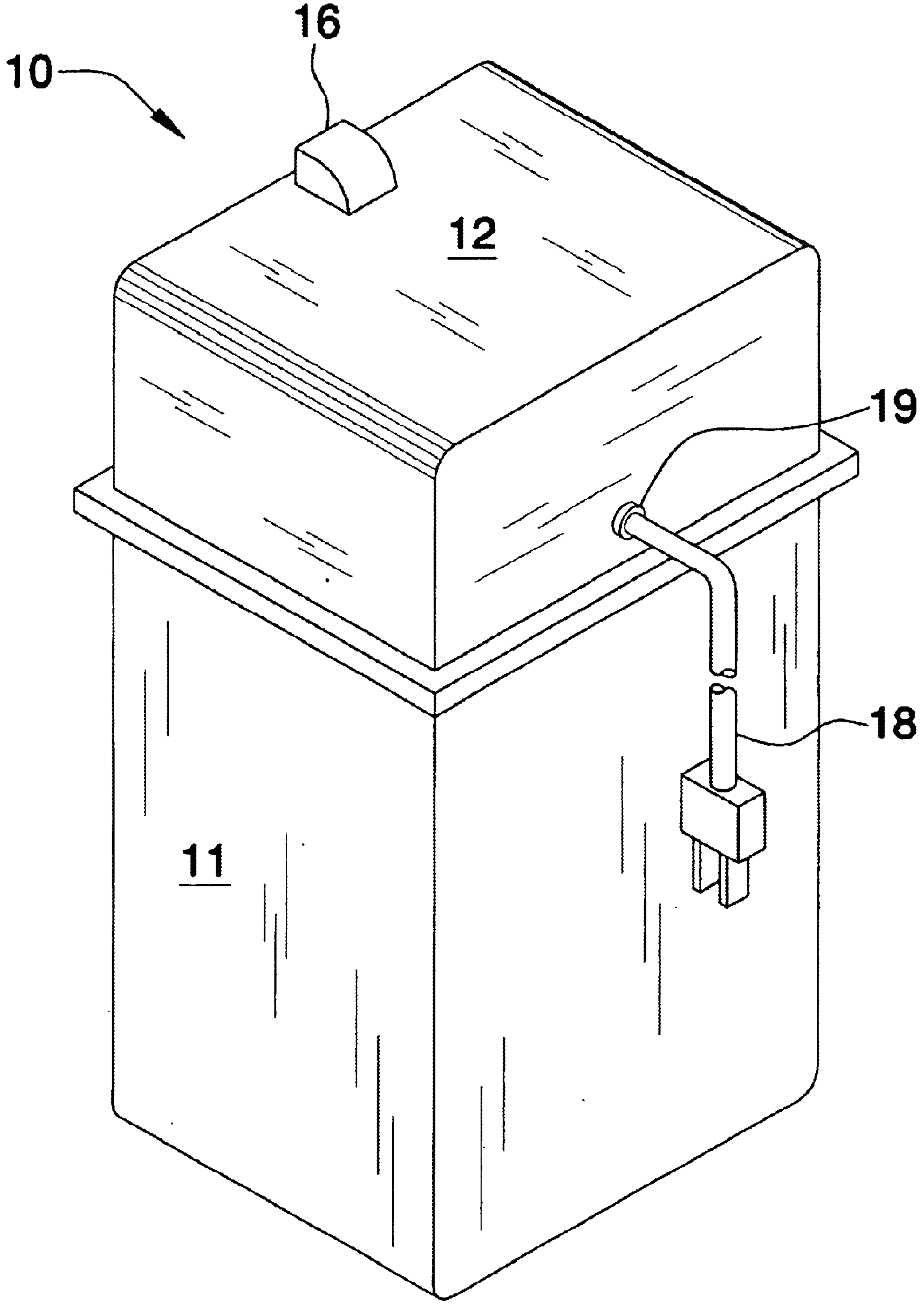
FIG. 2 is a rear perspective view thereof.

Now referring to FIG. 2, a rear side of garbage container 10 is shown wherein the lid section 12 includes an opening in the rear wall thereof for allowing a power cord 18 to pass therethrough. Power cord 18 is preferably a conventional power cord, as well known in the art. A bushing 19 helps secure the power cord 18 to the rear wall of lid section 12.

Figure 3:
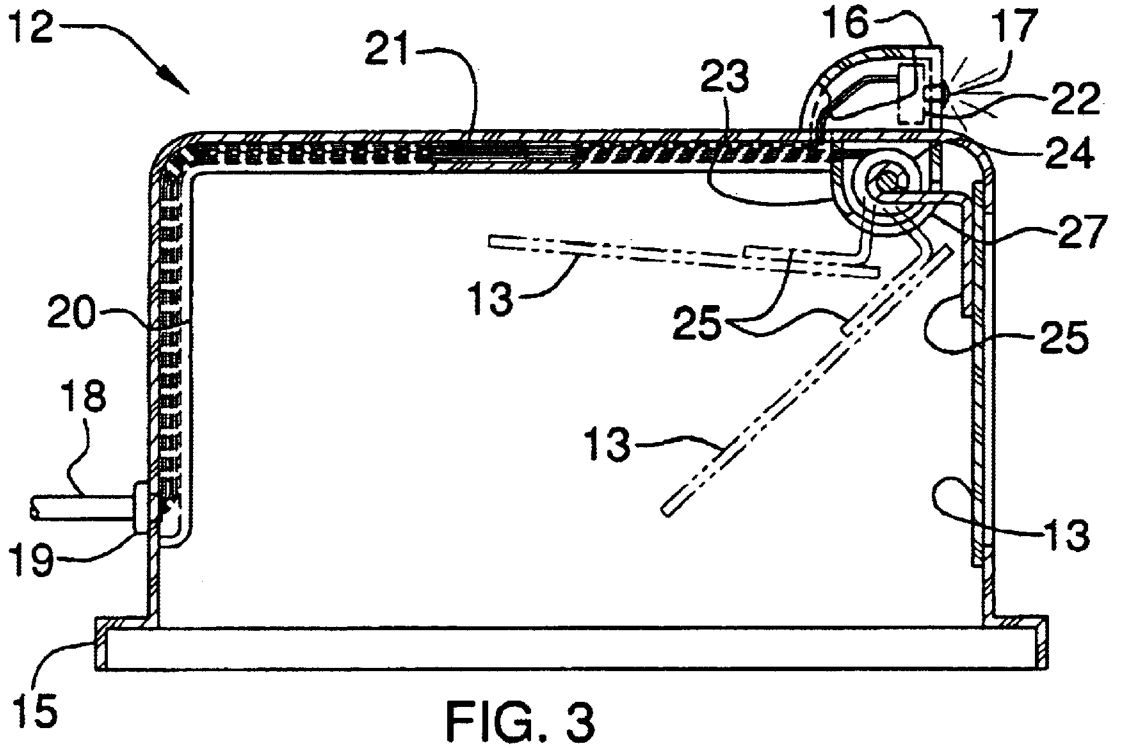
FIG. 3 is an enlarged cross-sectional view taken along line 3—3 in FIG. 1.
Figure 4:
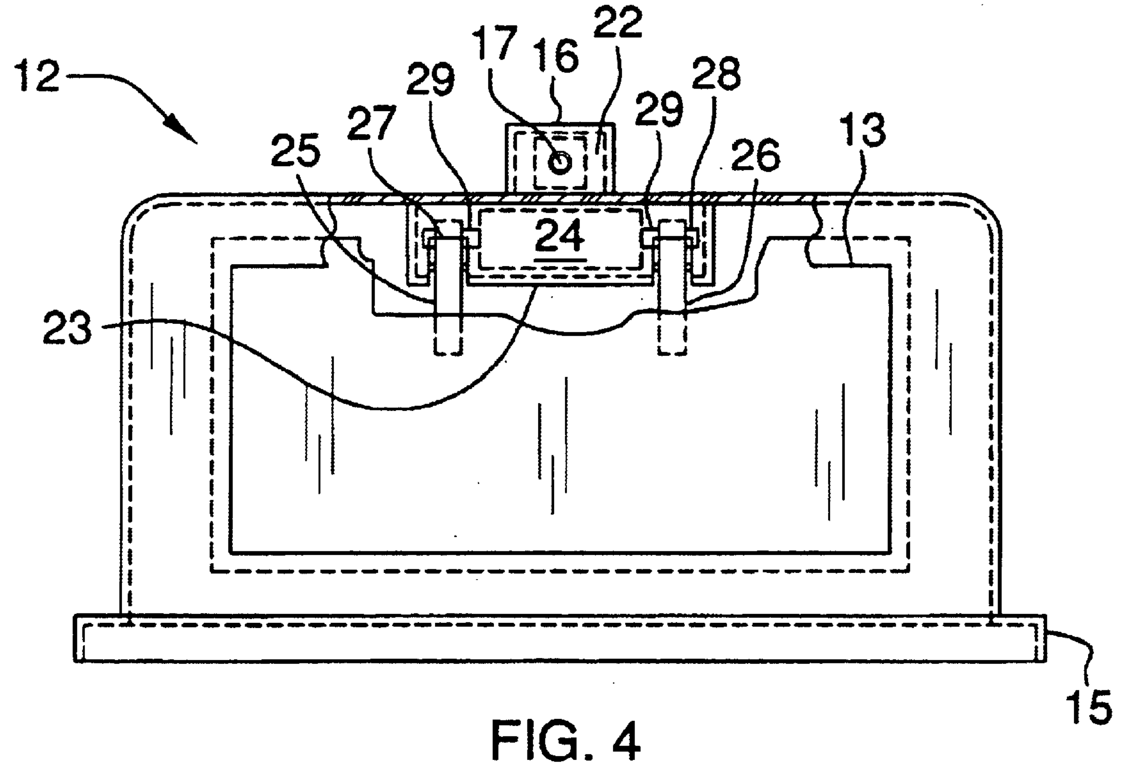
FIG. 4 is an enlarged partial cross-sectional view of the lid section shown in FIG.

Now referring to FIGS. 3 and 4, the lid section 12 is shown as including a conduit 20 for defining a channel through which wires 21 of power cord 18 pass. Accordingly, the conduit 20 guides the power cord 18 along a rear and top wall of lid section 12 and into the sensor housing 16 and motor housing 23. The sensor housing 16 includes a sensor 22 disposed therein and connected to the sensor eye 17 for operating same. Sensor 22 is preferably an infrared sensor that responds to changes in motion. Of course, other conventional sensors that respond to different physical stimuli such as lights for example, may be employed.

The motor housing 23 is attached to the bottom surface of a top wall of lid section 12 and extends downwardly therefrom adjacent to the top portion of access door 13. The motor housing 23 includes a motor 24 disposed therein and powered by power cord 18. Similarly, sensor 22 is powered by power cord 18 and is connected to motor 24 for sending signals thereto and for moving the access door 13 between open and closed positions.

Motor 24 includes an elongate rod 27 passing therethrough and having opposed end portions extending outwardly therefrom. Such end portions are connected to arm members 25, 26. In particular, the rod end portions are connected to a first end portion of arm members 25, 26, respectively, and cooperate therewith, for pivoting such arm members 25, 26 about a longitudinal axis of rod 29. Each arm member 25, 26 has a second opposed end portion respectively connected to the top portion of the access door 13. Accordingly, as arm members 25, 26 are pivoted in a rearward direction, the access door 13 is caused to open rearwardly, as clearly shown in FIG. 3.

Slots 27, 28 are formed at a lower portion of the motor housing 23 and define the forward and rearward positions of arm members 25, 26. Thus, when the access door 13 is at a closed position, the arm members 25, 26 are positioned adjacent to a forward end portion of slots 27, 28. Likewise, when the access door 13 is at an open position, the arm members 25, 26 are positioned at a rearward end portion of slots 27, 28.

In operation, when an object approaches the garbage container 10, the sensor eye 17 will sense the object within a predetermined distance. The sensor motor 22 then sends a signal to motor 24 to open the access door 13. In particular, the motor 24 cooperates with rod 29 passing therethrough and causes rod 29 to rotate about its longitudinal axis so that arm members 25, 26 pivot about the end portions of rod 29.

With the access door 13 open, a user may deposit waste material into the garbage container 10 without having to push the access door 13 open with their hands. After a user has walked away a predetermined distance, the sensor eye 17 is unable to sense the presence of the user and will cause the motor 24 to rotate in an opposite direction. Consequently, the access door 13 is caused to move to a closed position by pivoting arm members 25, 26 forwardly along the paths defined by slots 27, 28.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An apparatus for receiving garbage and comprising:

a base section defining an opening for collecting garbage;

a lid section attachable to said base section, said lid section including an access door pivotally operable therewith, said lid section having a top surface;

means for selectively moving said access door between open and closed positions and comprising a sensor connected to the top surface of said lid section and for determining when an object has reached a predetermined distance therefrom, a housing and a motor disposed therein and connected to said sensor, said housing having a plurality of slots formed therein and spaced apart from each other, and a plurality of arm members each having a first end portion passing through a corresponding one of said plurality of slots and being operable by said motor, said plurality of arm members each having a second opposed end portion connected to said access door respectively, said plurality of arm members being selectively pivotable about their first end portions respectively and in a generally arcuate path so that when the second end portions thereof move toward a rear portion of said lid section said access door is moved to an open position and when the second end portions move toward a front portion of said lid section said access door is moved to a closed position; and a power cord connected to said sensor and said motor and for supplying power thereto.

2. The apparatus of claim 1, wherein said lid section further comprises a conduit for guiding said power cord from a rear portion of said lid section to a front portion thereof.

3. The apparatus of claim 1, wherein said motor includes a rod passing therethrough and operably controlled thereby, said rod having a longitudinal axis and opposed end portions extending outwardly from said motor, said first end portions of said plurality of arm members being connected to said end portions of said rod respectively.

4. The apparatus of claim 1, wherein said plurality of arm members have a substantially L-shape.

5. The apparatus of claim 1, wherein said housing has a lower portion and said plurality of slot portions are formed thereat.

6. The apparatus of claim 1, wherein said access door has a top portion and said respective second end portions of said plurality of arm members are attached adjacent thereto.

7. The apparatus of claim 6, wherein said access door is pivotable about its top portion.

8. A garbage container comprising:

a base section including a plurality of sidewalls integral with each other and defining an opening therein for collecting garbage;

a lid section removably attachable onto said base section, said lid section including an access door pivotally operable therewith, said lid section having a top surface;

means for selectively moving said access door between open and closed positions and comprising a sensor connected to the top surface of said lid section and for determining when an object has reached a predetermined distance therefrom, a housing and a motor disposed within said housing and connected to said sensor and disposed therebelow, said housing having a plurality of slots formed therein and spaced apart from each other, and a plurality of arm members each having a first end portion passing through a corresponding one of said plurality of slots and being operable by said motor, said plurality of arm members each having a second opposed end portion connected to said access door respectively, said plurality of arm members being selectively pivotable about said first end portions and in a substantially arcuate path when said sensor sends signals to said motor so that when the second end portions thereof move toward a rear portion of said lid section said access door is moved to an open position and when the second end portions move toward a front portion of said lid section said access door is moved to a closed position; and a power cord connected to said sensor and said motor and for supplying power thereto.

9. The garbage container of claim 8, wherein said lid section further comprises a conduit for guiding said power cord from a rear portion of said lid section to a front portion thereof.

10. The garbage container of claim 8, wherein said motor includes a rod passing therethrough and operably controlled thereby, said rod having a longitudinal axis and opposed end portions extending outwardly from said motor, said first end portions of each said plurality of arm members being connected to one said end portions of said rod respectively.

11. The garbage container of claim 8, wherein said plurality of arm members are formed to be substantially L-shaped.

12. The garbage container of claim 8, wherein said housing has a lower portion and said plurality of slot portions are formed thereat.

13. The garbage container of claim 8, wherein said access door has a top portion and each said second end portion of said plurality of arm members is attached adjacent thereto.

14. The garbage container of claim 13, wherein said access door is pivotable about its top portion.

15. A garbage container for promoting sanitary conditions and comprising:

a base section including a plurality of sidewalls integral with each other and defining an opening therein for collecting garbage;

a lid section removably attachable to said base section, said lid section including an access door pivotally operable therewith, said lid section having a top surface;

means for selectively moving said access door between open and closed positions and comprising a sensor connected to the top surface of said lid section and for determining when an object has reached a predetermined distance therefrom, housing and a motor disposed within said housing and connected to said sensor and disposed therebelow and rearward of said access door, said housing having a plurality of slots formed therein and spaced apart from each other, and a plurality of arm members each having a first end portion passing through a corresponding one of said plurality of slots and being operable by said motor, said plurality of arm members each having a second opposed end portion connected to said access door respectively, said plurality of arm members being selectively pivotable about said first end portions respectively and in a substantially arcuate path when said sensor sends signals to said motor so that when the second end portions thereof move toward a rear portion of said lid section said access door is moved to an open position and when the second end portions move toward a front portion of said lid section said access door is moved to a closed position; and a power cord connected to said sensor and said motor and for supplying power thereto, said lid section further includes a conduit for guiding said power cord from a rear portion of said lid section to a front portion thereof.

16. The garbage container of claim 15, wherein said motor includes a rod passing therethrough and operably controlled thereby, said rod having a longitudinal axis and opposed end portions extending outwardly from said motor, said first end portions of said plurality of arm members being connected to said end portions of said rod respectively.

17. The garbage container of claim 15, wherein said plurality of arm members have a substantially L-shape.

18. The garbage container of claim 15, wherein said housing has a lower portion and said plurality of slot portions are formed therein.

19. The garbage container of claim 15, wherein said access door has a top portion and said second end portions of said plurality of arm members are attached adjacent thereto.

20. The garbage container of claim 19, wherein said access door is pivotable about its top portion.

* * * * *